(12) United States Patent
Kawai et al.

(10) Patent No.: US 7,850,406 B2
(45) Date of Patent: Dec. 14, 2010

(54) METHOD FOR SETTING WORKING ORIGIN AND MACHINE TOOL FOR IMPLEMENTING THE SAME

(75) Inventors: Tomohiko Kawai, Yamanashi (JP);
Kenzo Ebihara, Yamanashi (JP);
Yonpyo Hon, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 742 days.

(21) Appl. No.: 11/898,067

(22) Filed: Sep. 7, 2007

(65) Prior Publication Data

US 2008/0063483 A1    Mar. 13, 2008

(30) Foreign Application Priority Data

Sep. 8, 2006    (JP) .............. 2006-243856

(51) Int. Cl.
*B23C 1/00*    (2006.01)
*B23Q 15/24*    (2006.01)
*G06F 19/00*    (2006.01)

(52) U.S. Cl. ..................... 409/84; 409/80; 409/148; 409/208; 408/13; 700/192

(58) Field of Classification Search ............. 409/84, 409/80, 79, 131–132, 147, 148, 149, 150, 409/151, 154, 155, 186–188, 193–195, 207–208; 408/1 R, 13, 11, 10, 9, 8; 700/192, 186, 700/188, 176, 175, 170; 318/569, 600
See application file for complete search history.

(56) References Cited

U.S. PATENT DOCUMENTS

| | | | | |
|---|---|---|---|---|
| 3,846,688 A | * | 11/1974 | Perloff | 318/490 |
| 4,847,777 A | * | 7/1989 | Konno | 700/192 |
| 5,070,288 A | * | 12/1991 | Ikeda et al. | 318/618 |
| 7,056,072 B2 | * | 6/2006 | Mizutani et al. | 409/131 |
| 7,101,126 B2 | * | 9/2006 | Kakino et al. | 409/84 |

FOREIGN PATENT DOCUMENTS

| | | | |
|---|---|---|---|
| JP | 05-146947 A | * | 6/1993 |
| JP | 2004-34278 | | 2/2004 |
| JP | 2004-98213 | | 4/2004 |
| JP | 2004-188525 | | 7/2004 |

* cited by examiner

*Primary Examiner*—Erica E Cadugan
(74) *Attorney, Agent, or Firm*—Drinker Biddle & Reath LLP

(57) ABSTRACT

A method for setting a working origin for a rotary tool in contact with a work piece to be machined, having: applying to a main spindle which holds the rotary tool, with a tip of a cutting edge of the rotary tool in contact with an outer surface of the work piece fixed to a work table, a load torque to such an extent that the rotary tool is not caused to be rotated; applying the load torque to the main spindle, and moving either the work table or the main spindle in a jog feed in a direction of any one of feed shafts such that the tip of the cutting edge is moved away from the outer surface along an axial direction of the rotary tool or in the direction orthogonal to the axial direction; and setting a coordinate at the moment when the main spindle starts rotation as a working origin of the jog feed in the direction of the any one of the feed shafts.

6 Claims, 7 Drawing Sheets

METHOD FOR SETTING WORKING ORIGIN AND MACHINE TOOL FOR IMPLEMENTING THE SAME

CROSS REFERENCE TO RELATED APPLICATION [FOR US]

The present application claims the benefit of priority based on Japanese Patent Application No. 2006-243856, filed on Sep. 8, 2006, the disclosure of which is incorporated herein in its entirety by reference.

BACKGROUND OF THE INVENTION

1. Field of the Invention

The present invention relates to a method for setting a working origin for machining with a rotary tool relative to a work piece to be machined, and to a machine tool for implementing the same method.

2. Description of the Related Art

Generally, in machine processing of a work piece using a cutting tool, each time a cutting tool and the work piece is exchanged, it is required to reset the starting position of the contact between the cutting tool and the work piece to be machined. In particular, when a metal die is to be machined with a rotary tool such as an end mill, higher accuracy in machining (dimensional accuracy, precision of finished surface) on the order of microns, or even on the order of nanometers, is required, and therefore, it is necessary to set the working origin with higher accuracy.

Setting a tool and a work piece to be machined is difficult and has to be done with utmost care while the feed shaft is being moved in a jog feed, which result in a very time consuming operation, and therefore requires a lot of experience and skill. Standardization of this operation is very difficult and there is a limitation in increasing work efficiency.

A method for automating this operation and setting the working origin efficiently in a short time is disclosed in Japanese Patent Publication No. 2004-98213. This method requires a special measuring apparatus including a sensor, which increases costs. In addition, the sensing surface is provided in a direction perpendicular to a rotation axis of the tool, although a position in the direction of the rotation axis of the tool can be detected, it is not possible to detect a position in the direction perpendicular to the rotation axis, in other words, in the radial direction of the tool. Further, this method can only be applied to a small diameter tool with an outer diameter not greater than 100 μm, and therefore applicable range of the method is limited.

As another method in prior art, a method is known in which a dedicated device provided with a microscope for detecting a tool is used. With this tool detection device, there is a problem that, although the position of a tool can be detected, the position of the work piece to be machined cannot be detected. Further, there is a problem that, when a tool with a sharp cutting edge is used, the position of the tip of the cutting edge cannot be accurately detected. In other words, when a microscope is used, the distance between the cutting edge and the work piece can be measured so as to bring the tool as close as possible to the work piece, but depending on the machining arrangement, it may be impossible to bring the cutting edge into view due to the focal length of the microscope.

SUMMARY OF THE INVENTION

In view of above problems, it is an object of the present invention to provide a method for setting the working origin of a rotary tool relative to a work piece to be machined easily and at no cost, and to provide a machine tool for implementing the same method.

In order to attain the above object, in accordance with an aspect of the present invention, there is provided a method for setting a working origin of a rotary tool relative to a work piece to be machined, comprising: applying to the main spindle that holds the rotary tool, with the tip of the cutting edge of the rotary tool in contact with the outer surface of the work piece fixed to a work table, a load torque to such an extent that the rotary tool is not caused to be rotated, applying the load torque to the main spindle, and moving either the work table or the main spindle in a jog feed in a direction of any one of feed shafts such that the tip of the cutting edge is moved away from the outer surface along an axial direction of said rotary tool or in a direction orthogonal to the axial direction, and setting a coordinate at the moment when the main spindle starts rotation as a working origin of the jog feed in the direction of the feed shafts.

In accordance with this invention, in the case where three dimensional cutting is performed by feeding a rotary tool in a direction perpendicular to the shaft with a specified cutting depth in an axial direction of the rotary tool, in order to determine the working origin for the rotary tool relative to the work piece in the axial direction of the rotary tool, a weak load torque is applied to the main spindle with the cutting edge of the rotary tool in contact with a side of the work piece (the surface intersecting the surface to be machined) to such an extent that the rotary tool is not rotated, and either the table or the main spindle is moved in a jog feed so as to move the cutting edge of the rotary tool vertically away from the surface to be machined, and the coordinate determined at the moment when the main spindle starts rotation by the load torque is set as the working origin. In order to determine the working origin for the rotary tool relative to the work piece in the direction perpendicular to the axis of the rotary tool, a weak load torque is applied to the main spindle with the cutting edge of the rotary tool in contact with the surface of the work piece to be machined to such an extent that the rotary tool is not rotated, and either the table or the main spindle is moved in a jog feed so as to move the cutting edge of the rotary tool vertically away from the surface to be machined, and the coordinate determined at the moment when the main spindle starts rotation is set as the working origin. In this way, the working origin can be determined in two mutually orthogonal directions, in other words, in the axial direction of the rotary tool and in the direction perpendicular to the axis of the rotary tool. Thus the working origin of the rotary tool relative to the work piece can be easily and accurately determined using existing equipment without requiring new equipment to be provided.

In accordance with an aspect of the present invention, there is provided a machine tool that can be used to implement the method for setting a working origin of a rotary tool relative to a work piece, comprising a main spindle for rotating the rotary tool, a sensor for detecting a rotation of the main spindle, a work table for holding the work piece to be machined, a driving source for applying, with the tip of the cutting edge of the rotary tool in contact with the outer surface of the work piece to be machined, a load torque to the main spindle to such an extent that the rotary tool is not caused to be rotated, and a controller having a working origin setting section for setting the coordinate as the working origin, the coordinate being determined when the rotation of the main spindle is detected by the sensor during a jog feed motion in which either the main spindle or the work table is moved so as to displace the tip of the cutting edge away from the outer surface with said torque applied to the main spindle.

In accordance with this invention, since the working origin setting section has the function of automatically correcting the machining start position, the working origin can be offset to a new working origin in accordance with the dimension etc., of the work piece to be machined at the time of exchange of the rotary tool or the work piece or at the end of one pass of machining. The present invention is applicable to a machine tool provided with a main spindle that is rotated by an air turbine motor or an electric motor as the driving source. In case where the main spindle is rotated by an air turbine motor as a driving source, the pressure of compressed air supplied to the air turbine motor can be controlled by an electric signal to thereby control the load torque applied at the time of contact of the rotary tool with the work piece. In the case where the main spindle is rotated by an electric motor as a driving source, the electric current supplied to the motor can be controlled by an electric signal to thereby control the load torque applied at the time of contact of the rotary tool with the work piece.

BRIEF DESCRIPTION OF THE DRAWINGS

The above and other objects, features and advantages will become more apparent from the following description of preferred embodiments with reference to the appended drawings, in which.

DETAILED DESCRIPTION

Figure 1:
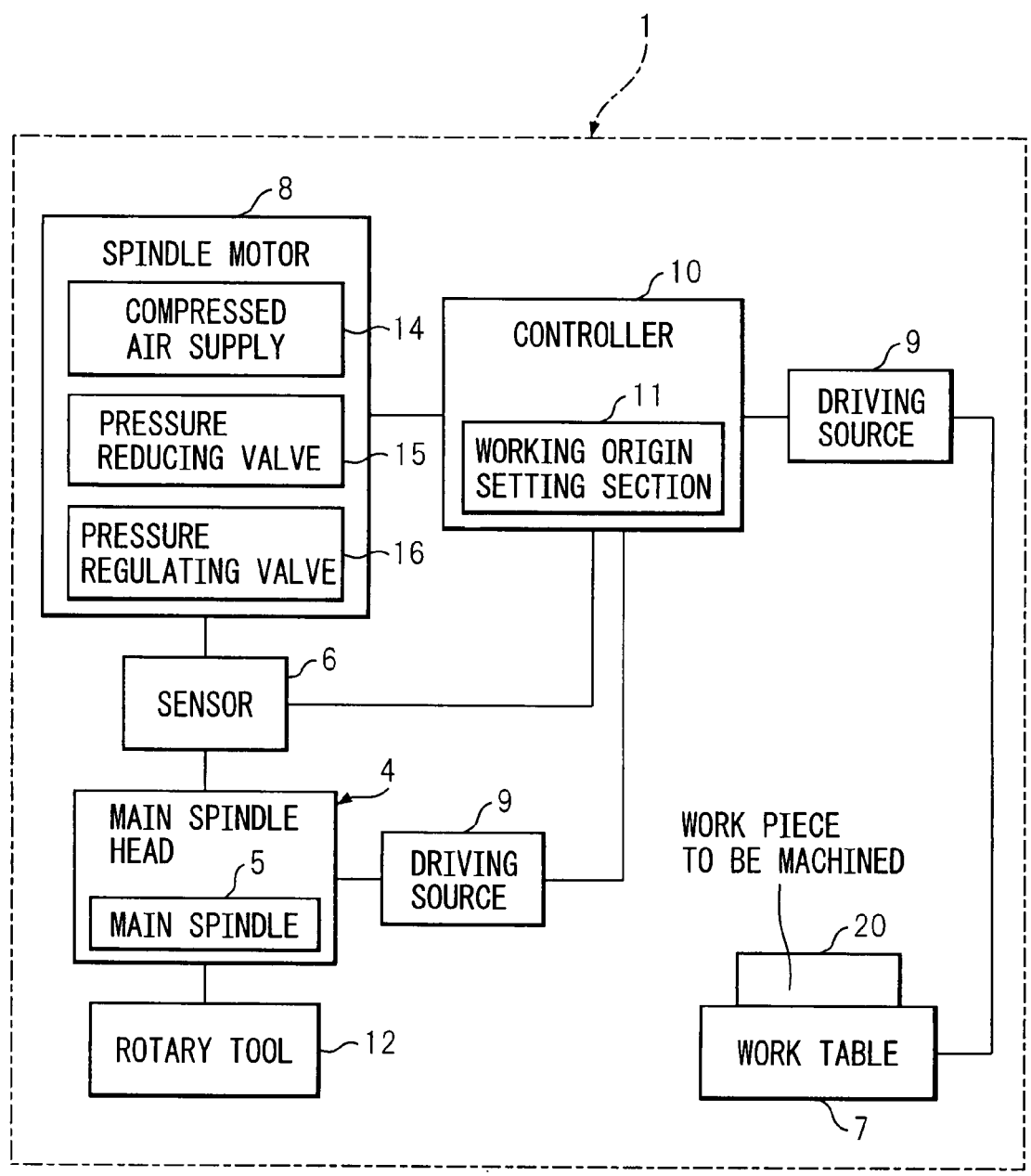
FIG. 1 is a view showing the construction of a machine tool according to an embodiment of the present invention.
Figure 2:
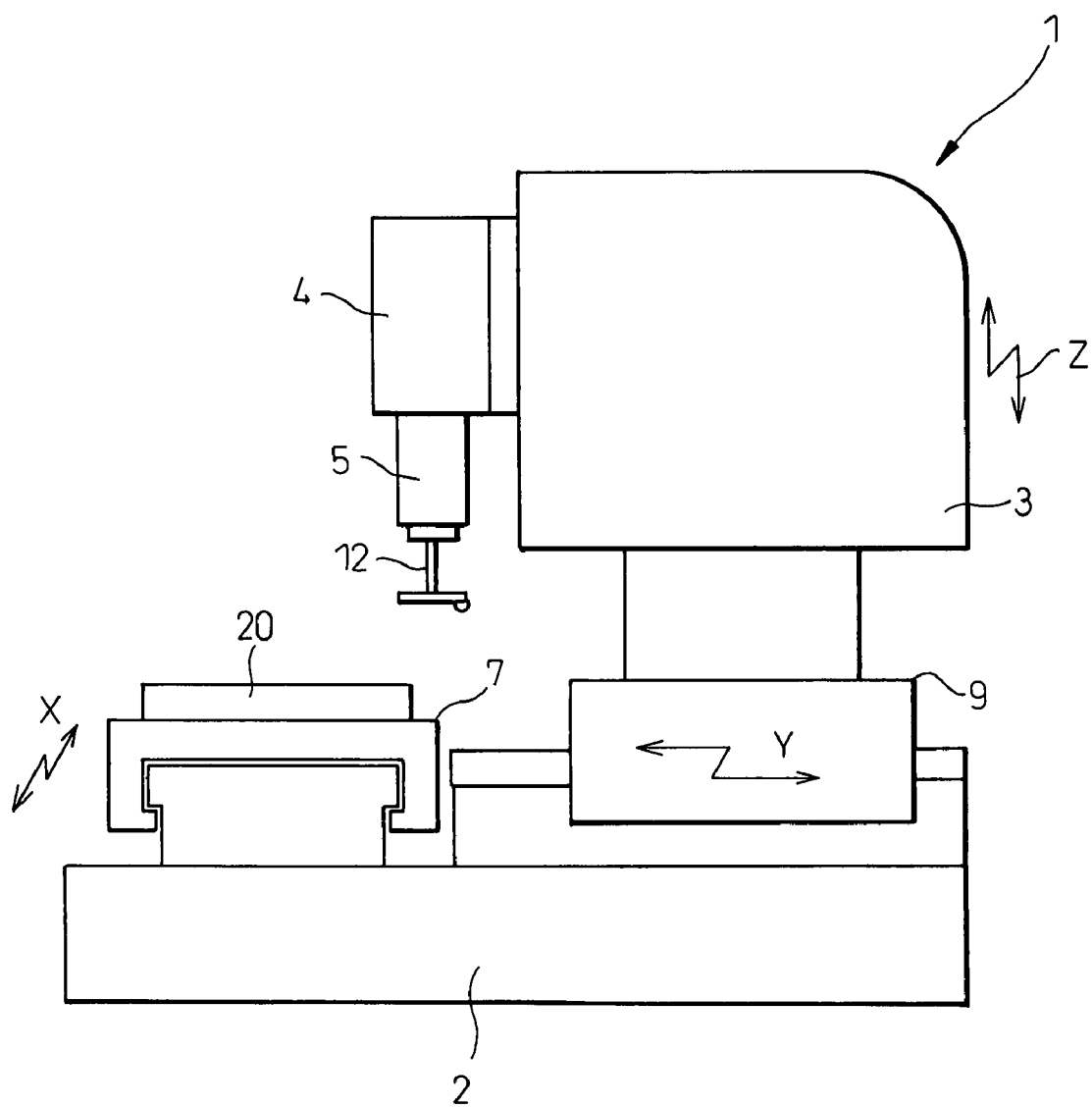
FIG. 2 is a schematic side view showing a vertical type machine tool having a vertical main spindle.

The present invention will be described in detail below with reference to the drawings showing specific examples of the embodiments thereof. FIG. 1 is a view showing the construction of a machine tool according to an embodiment of the present invention. FIG. 2 is a schematic side view showing a so-called vertical type machine tool in which a main spindle is disposed in a vertical direction. As shown in theses Figures, machine tool 1 according to this embodiment comprises a bed 2, a column 3 standing vertically from bed 2, a main spindle head 4 provided on the upper part of column 3 and movable in the vertical direction, a main spindle 5 mounted rotatably on main spindle head 4, a sensor 6 (FIG. 1) for detecting the rotation of main spindle 5, a work table 7 supported on bed 2 slidably so as to slide in a horizontal direction for clamping a work piece 20 with a jig or the like, a spindle motor 8 (driving source) for driving main spindle 5 in rotation, a plurality of feed shaft driving motors (driving sources) 9 for driving main spindle head 4 and work table 7 in the vertical direction (Z direction) and the horizontal directions (X and Y directions), respectively, and a controller 10 which controls driving of spindle motor 8 and a plurality of feed shaft driving motors 9.

Main spindle 5 clamps the shaft of a rotary tool such as an end mill, a cutter, a drill, etc., and rotates rotary tool 12 with motor 8 at a specified rotational speed and torque. Various sensors including a magnetic sensor incorporated in an unshown bearing of main spindle 5 can be used as sensor 6 for detecting the rotation of main spindle 5. An encoder may be used in place of the sensor, when an electric motor is used as the spindle motor.

Work table 7 is constructed such that it can be moved in a horizontal plane in the two mutually orthogonal X and Y directions by using a feed mechanism consisting of a combination of air bearings and linear motors. The feed speed of work table 7 can be set arbitrarily, and work table 7 can be moved in units of microns, or even nanometers, in various modes such as cutting feed mode, quick feed mode, and jog feed mode.

The feed mechanism of main spindle head 4 may be constructed in a similar manner as the feed mechanism of work table 7. Main spindle head 4 is adapted to be moved up and down in the vertical direction by means of the feed mechanism. Main spindle head 4 also can be moved in units of microns, or even nanometers, in the selected feed mode.

A linear motor controlled by a linear scale, for example, may be used as an individual feed shaft-driving linear motor 9 for driving work table 7 or main spindle head 4. The linear motor uses a linear scale reading head to detect the displacement, which is utilized as the position information to ensure the accuracy of the output shaft of the linear motor.

Spindle motor 8 for rotating main spindle 5 is an air turbine motor having a compressed air supply 14 for supplying compressed air to unshown turbine blades in main spindle 5, a pressure reducing valve 15 for reducing the pressure of compressed air, and a pressure regulating valve 16. Pressure reducing valve 15 is used to suppress the pressure of the supplied air at a pressure not higher than a predetermined value when the pressure generated by the pressure source is higher than the predetermined value, and outputs the supplied air after regulating the input pressure to a value not higher than a specified pressure. Pressure regulating valve 16 is an electromagnetic valve that controls the electromagnetic force in accordance with the electric signal from controller 10 to adjust opening of the valve. With this, motor 8 is controlled so as to be rotated stably by a specified torque.

Controller 10 includes a digital servo circuit composed of a processor, a ROM, a RAM, and the like, and is electrically connected via communication lines to spindle motor 8, a plurality of feed shaft driving motors 9, an unshown programmable controller, a control panel and peripheral devices so as to exhibit various functions. Controller 10 of machine tool 1 according to the present invention comprises a working origin setting section 11 having the function of setting the working origin as the reference machining coordinates of rotary tool 12 and work piece 20 to be machined. As will be described later, working origin setting section 11 is a means for setting the working origin, the coordinates at the moment when, with cutting edge 13 of rotary tool 12 in contact with work piece 20 to be machined, and with a small load torque being applied to main spindle 5, and either the main spindle head 4 or work table 7 being moved in a jog feed, the tip of cutting edge 13 leaves work piece 20 and main spindle 5 begins to be rotated.

Figure 3:
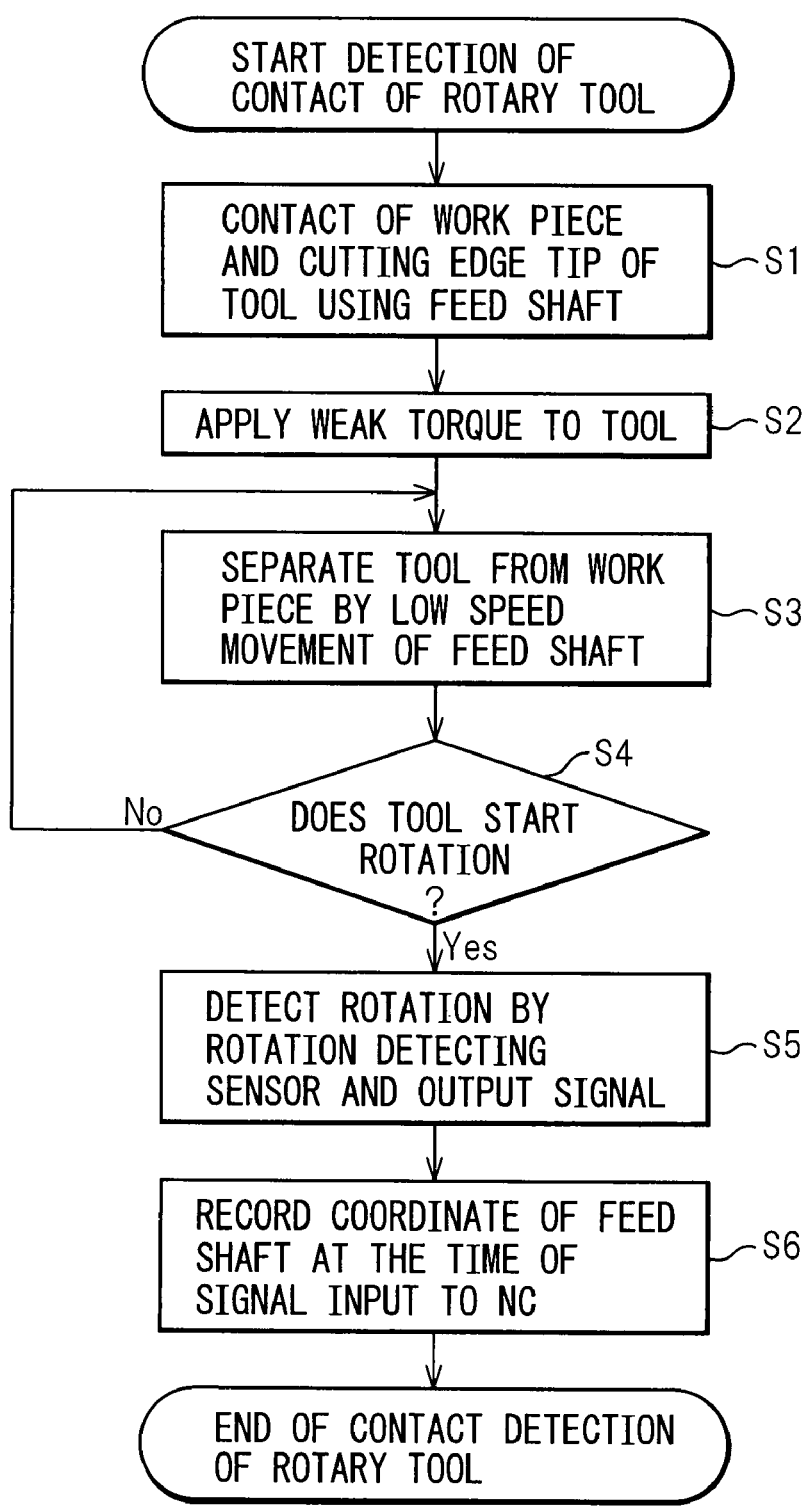
FIG. 3 is a flow chart showing a method for setting a working origin for a rotary tool relative to a work piece.
Figure 4:
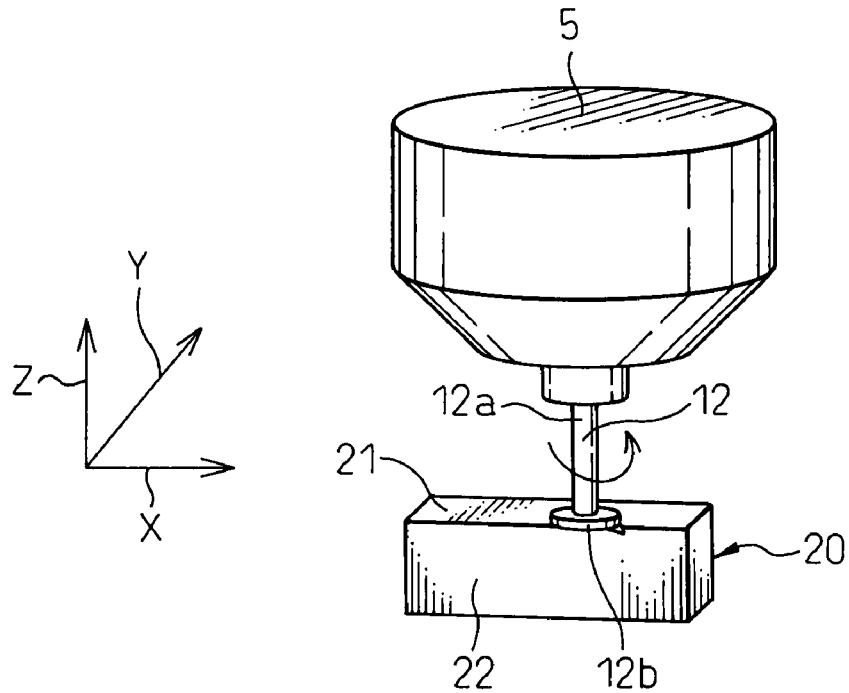
FIG. 4 is a schematic view showing the state of a rotary tool with rotation stopped by the contact of the tip of the cutting edge with a side of the work piece to be machined.
Figure 5:
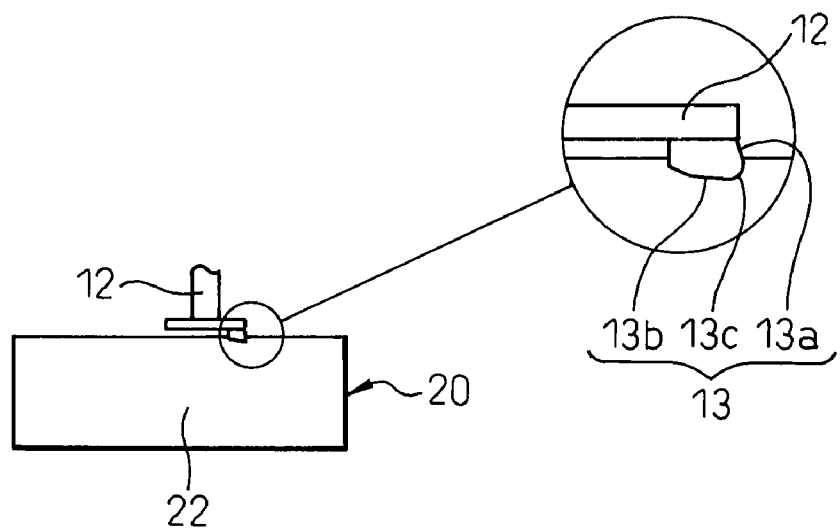
FIG. 5 is a front view showing the rotary tool and the work piece to be machined shown in FIG. 4.
Figure 6:
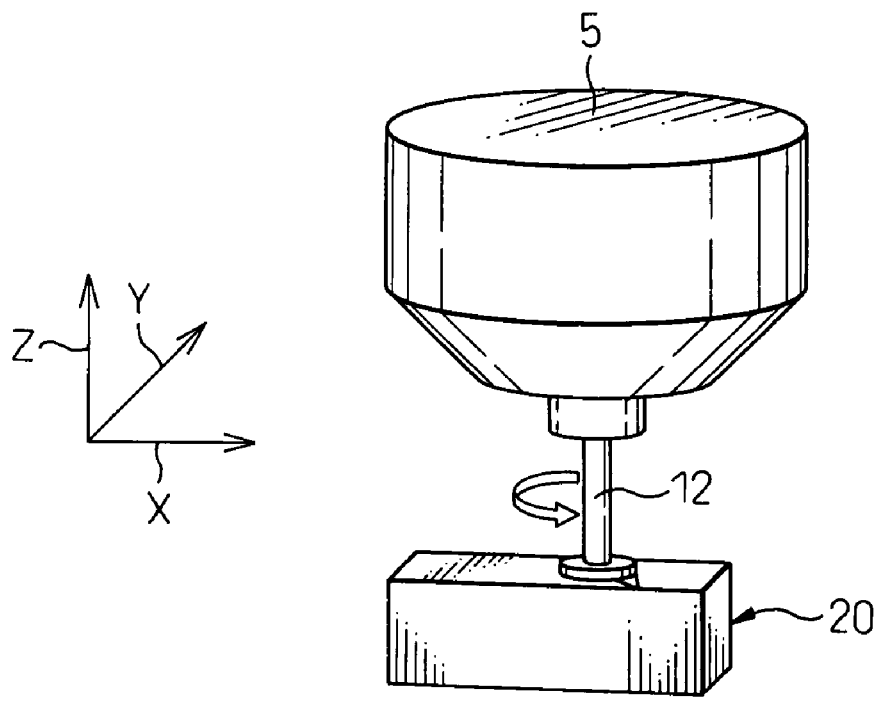
FIG. 6 is a schematic view showing the state of a rotary tool at the moment when the tip of the cutting edge of the rotary tool leaves the side of the work piece to be machined (in which the rotary tool is being rotated)
Figure 7:
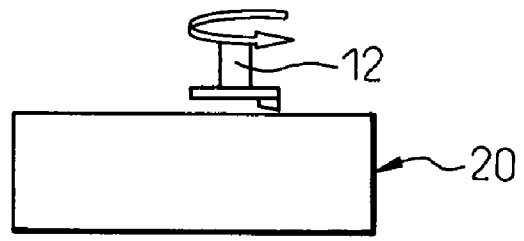
FIG. 7 is a front view showing the rotary tool and the work piece to be machined shown in FIG. 6.

Next, a method for setting the working origin using machine tool 1 according to the present invention will be described. FIG. 3 is a flow chart showing the method for setting the working origin, FIGS. 4 and 5 are schematic views showing the state of rotary tool 12 and work piece 20 to be machined in contact with each other, and FIGS. 6 and 7 are schematic views showing the state of rotary tool 12 and work piece 20 to be machined separated from each other. Main spindle 5 shown in FIGS. 4 to 7 is, as in FIG. 2, a main spindle that is disposed along the vertical direction in vertical type machine tool 1.

Illustrated rotary tool 12 is a face milling tool consisting of a body 12b having a single cutting edge and a shank 12a. Cutting edge 13 has an outer peripheral cutting edge region 13a situated at a radially outside position, a front cutting edge region 13b intersecting the outer peripheral cutting edge region 13a and situated at axially distal end position, and a corner cutting edge region 13c situated between the outer peripheral cutting edge region 13a and front cutting edge region 13b, and projects downward from the lower surface of body 12b. The corner cutting edge region serves as a main cutting edge, which is formed as an arch-shaped cutting edge region having a specified corner radius. The magnitude of the corner radius of corner cutting edge 13c determines the theoretical roughness of the finished surface. In a case where body 12b has multiple cutting edges disposed generally at equal pitch along the circumferential direction, the working origin is set with reference to the cutting edge which projects downward to the greatest extent among the multiple cutting edges.

In FIGS. 4 to 7, work piece 20 to be machined is formed of a polygonal pillar, wherein the surface to be machined by rotary tool 12 is situated at top surface 21. Around top surface 21, two sets of opposing sides 22 are formed perpendicularly to top surface 21. In the cutting operation using rotary tool 12, a predetermined cutting depth is given in the Z-direction, and the cutting operation is performed three-dimensionally while being moved in the X-direction at a predetermined feed velocity. When the machining allowance for the cutting operation is large, cutting of the surface to be machined is performed and finished in plural passes. When high precision in surface roughness is required for the surface to be machined, cutting with rotary tool 12 is completed, leaving a finishing allowance of a shallow cutting depth, and finishing operation can be performed thereafter with a dedicated finishing rotary tool.

First, a method for setting a working origin in the Z-direction will be described. At step 1 of FIG. 3, work table 7 and main spindle head 4 are moved relative to each other so as to bring the tip of cutting edge 13 of rotary tool 12 into light contact with side 22 of work piece 20 to be machined (FIGS. 4 and 5). In this contacting state, the face of cutting edge 13 is opposed to side 22 of work piece 20 to be machined. Next, at step 2, main spindle 5 is rotated so as to bring the face of cutting edge 13 into contact with side 22 of work piece 20 to be machined, and with a small load torque applied to main spindle 5, the tip of cutting edge 13 is abutted against side 22.

At step 3, starting from the state at step 2, main spindle head 4 is moved in a jog feed upward in the Z-direction along side 22 with the tip of the cutting edge 13 situated in the same plane as top surface 21 of work piece 20 until the moment at which rotary tool 12 starts rotating. At step 4, it is determined whether or not rotary tool 12 starts rotation. If it is determined that the rotary tool 12 has not started rotating, the process returns to step 3 and the jog feed is continued. If it is determined that the rotary tool 12 has started rotating, the process proceeds to step 5.

At step 5, with the tip of cutting edge 13 of rotary tool 12 situated on the same plane as top surface 21 of work piece 20 (FIGS. 6 and 7), upon detecting the rotation of rotary tool 12 with sensor 6 for detecting the rotation, a detection signal is sent to working origin setting section 11 of the controller 10. At step 6, the coordinate in a Z-axis of main spindle head 4 at the moment of reception of the detection signal by working origin setting section 11 is stored in the memory. In this way, the working origin at which cutting edge 13 situated on the axially distal end of rotary tool 12 comes into contact with top surface 21 of work piece 20 to be machined is set. The working origin is determined as the machining reference coordinate showing relative position between rotary tool 12 and work piece 20 to be machined.

Next, another method for setting the working origin by using the machine tool according to the present embodiment will be described. This example differs from the above-described example in that the horizontal type machine tool is used in which a main spindle 25 is disposed in a horizontal direction, and a rotary tool 26 of a different type is used. Rotary tool 26 is an end mill having a single cutting edge for finishing. The shaft of rotary tool 26 is disposed along the Y-direction, and this also differs from the previous example in which the shaft of rotary tool 12 is in the Z-direction. Work piece 20 to be machined is similar to that in the previous example.

Figure 8:
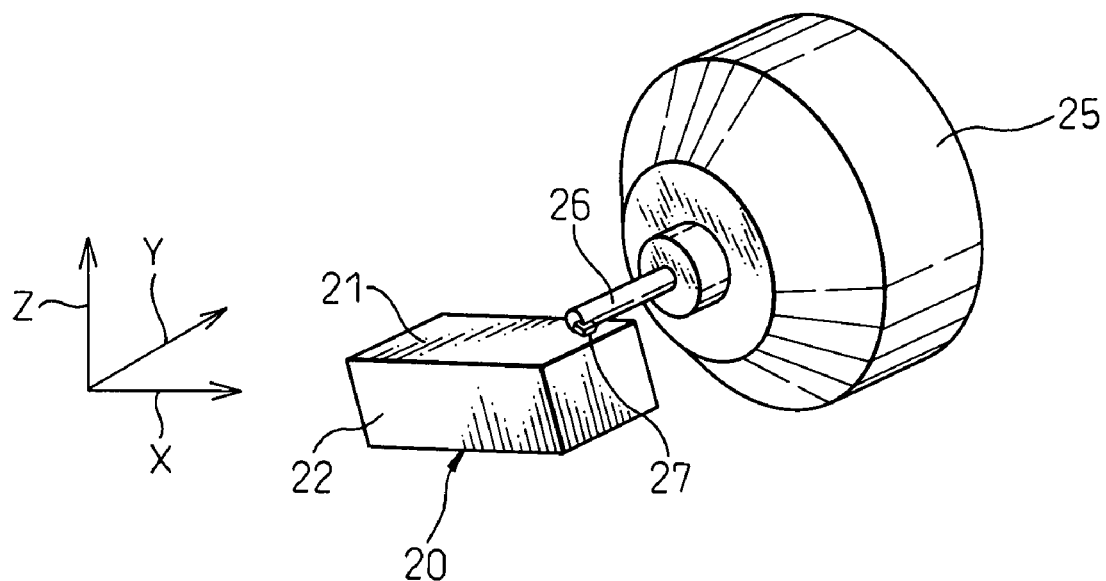
FIG. 8 is a schematic view showing a horizontal type machine tool having a horizontal main spindle in the state in which the rotation of a rotary tool is stopped by the contact of the tip of the cutting edge with a top surface of the work piece to be machined.
Figure 9:
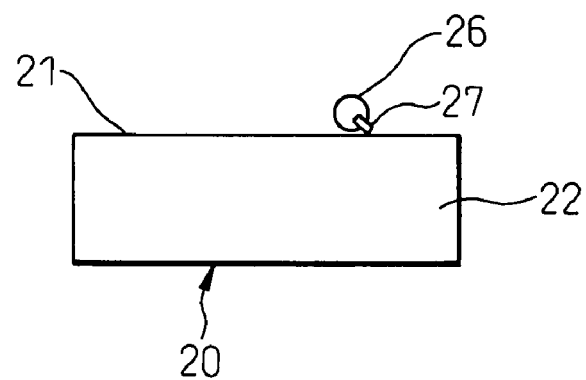
FIG. 9 is a front view showing the rotary tool and the work piece to be machined shown in FIG. 8.

In this method, at step 1 in FIG. 3, cutting edge 27 of rotary tool 26 is brought into contact with top surface 21 of work piece 20 to be machined (FIGS. 8 and 9). At step 2, the main spindle is rotated so as to bring the face of cutting edge 27 into contact with top surface 21 of work piece 20 to be machined, and with a small load torque applied to main spindle 25, the tip of cutting edge 27 is abutted against top surface 21.

At step 3, starting from the state at step 2, work table 7 is moved upward in the Z-direction in a jog feed up to the moment when the tip of cutting edge 27 leaves top surface 21 of work piece 20. At step 4, it is determined whether or not rotary tool 26 starts rotation, and if it is determined that rotary tool 26 has not started rotating, the process returns to step 3 and the jog feed is continued. If it is determined that rotary tool 26 has started rotating, the process proceeds to step 5.

Figure 10:
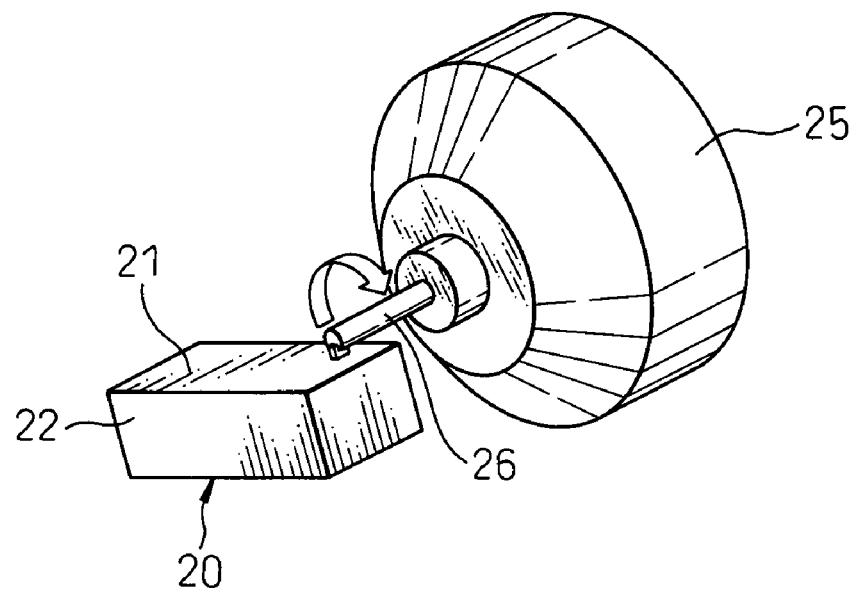
FIG. 10 is a schematic view showing the state of a horizontal type machine tool having a horizontal main spindle at the moment when the tip of the cutting edge of the rotary tool leaves the top surface of the work piece to be machined (in which the rotary tool is being rotated)
Figure 11:
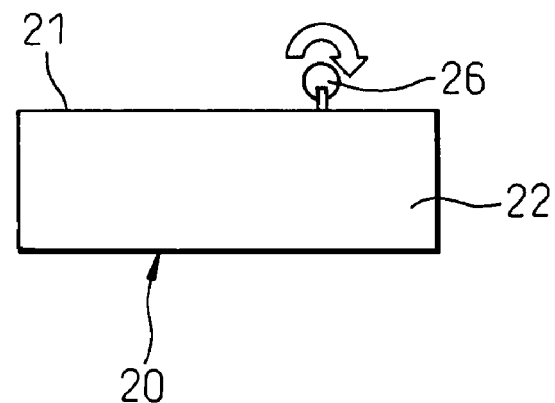
FIG. 11 is a front view showing the rotary tool and the work piece to be machined shown in FIG. 10.

At step 5, with the tip of cutting edge 27 of rotary tool 26 situated on the same plane as top surface 21 of work piece 20 (FIGS. 10 and 11), upon detection of the rotation of rotary tool 26 with the sensor for detecting the rotation, a detection signal is sent to working origin setting section 11 of controller 10. At step 6, the coordinate in the Z-axis of main spindle head 4 at the moment of reception of the detection signal by working origin setting section 11 is stored in the memory. In this way, the working origin at which cutting edge 27 situated radially outside (in the direction perpendicular to the shaft) of rotary tool 26 comes into contact with top surface 21 of work piece 20 to be machined is set.

As has been described above, in accordance with this embodiment, existing equipment can be used to easily and accurately determine the working origin in two mutually orthogonal directions, in other words, in an axial direction and in a direction perpendicular to the axis of rotary tool 12, 26, and the need for providing new equipment can be eliminated.

The present invention is by no means limited to above-described embodiments, and can be implemented in various modifications. Any geometry of the cutting edge of the rotary tool 12, 26 can be used in the present embodiments, and any end cutting edge, side cutting edge, front angle, relief angle and corner radius of cutting edge may be used. Although, in the present embodiments, working origin setting section 11 is described as a means for setting the working origin, it is also possible to impart to working origin setting section 11, a function of automatically offsetting the working origin by taking into account tool wear of cutting edge 13, 27.

The invention claimed is:

1. A method for setting a working origin of a rotary tool relative to a work piece to be machined, comprising:
    applying to a main spindle which holds said rotary tool for rotation about an axis, with a tip of a cutting edge of said rotary tool in contact with an outer surface of said work piece, which is fixed to a work table, a load torque to such an extent that said rotary tool is not rotated;
    applying said load torque to said main spindle, and moving either said work table or said main spindle in a jog feed in a direction such that said tip of said cutting edge is moved away from said outer surface along an axial direction of said rotary tool or in a direction orthogonal to the axial direction; and
    setting a coordinate in a controller at a moment when said load torque causes said main spindle to start rotation as a working origin of said jog feed in the direction.

2. A method according to claim 1,
    wherein said rotary tool has a single cutting edge.

3. A method according to claim 1,
    wherein said cutting edge of said rotary tool has an outer peripheral cutting edge region situated radially at an outside of said rotary tool, a front cutting edge region situated at an axially distal end of said rotary tool, and a corner cutting edge region connecting said outer peripheral cutting edge region and said front cutting edge region, and
    wherein to perform the bringing of the tip of the cutting edge of the rotary tool in contact with the outer surface of the work piece, said corner cutting edge region is brought into contact with a side of the work piece intersecting a surface to be machined of said work piece or with said surface to be machined.

4. A machine tool used for implementing a method for setting a working origin of a rotary tool relative to a work piece to be machined, said machine tool comprising:
    a main spindle for rotating said rotary tool;
    a sensor for detecting a rotation of said main spindle;
    a work table for holding said work piece to be machined;
    a driving source for applying, with a tip of a cutting edge of said rotary tool in contact with an outer surface of said work piece to be machined, a load torque to said main spindle to such an extent that said rotary tool is not rotated; and
    a controller having a working origin setting section that is adapted to set a coordinate as a working origin at a moment when the rotation of said main spindle is detected by said sensor during a jog feed, while, starting from the state in which said rotary tool is in contact with the outer surface of said work piece and said load torque is applied to said main spindle to such an extent that said rotary tool is not rotated, either said main spindle or said work table is moved in the jog feed in a direction such that said tip of said cutting edge is moved away from said outer surface.

5. A machine tool according to claim 4,
    wherein said working origin is a machining reference coordinate showing relative positional relation of said rotary tool and said work piece to be machined, and said working origin setting section has a function of modifying said working origin.

6. A machine tool according to claim 4,
    wherein said load torque is adjusted by an electric signal between said driving source and said controller that controls said driving source.

* * * * *